United States Patent [19]

Invernizzi et al.

[11] 4,329,374

[45] May 11, 1982

[54] METHOD FOR PRODUCING A STERILIZED PROCESSED CHEESE HAVING A CREAMY TEXTURE

[75] Inventors: Rutilio Invernizzi, Milan; Giovanni Prella, Vercelli, both of Italy

[73] Assignee: Societe d'Assistance Technique pour Produits Nestle S.A., Lausanne, Switzerland

[21] Appl. No.: 130,568

[22] Filed: Mar. 14, 1980

Related U.S. Application Data

[63] Continuation of Ser. No. 882,220, Feb. 28, 1978, abandoned.

[30] Foreign Application Priority Data

Mar. 2, 1977 [IT] Italy .................................. 48268 A/77

[51] Int. Cl.³ ............................................. A23C 19/00
[52] U.S. Cl. ..................................... 426/582; 426/521
[58] Field of Search ................. 426/580, 582, 36, 521, 426/399, 130

[56] References Cited

U.S. PATENT DOCUMENTS

| | | | |
|---|---|---|---|
| 1,428,602 | 9/1922 | Malekow | 426/399 |
| 3,635,733 | 1/1972 | Kichline et al. | 426/582 |
| 3,697,293 | 10/1972 | Breidenstein | 426/399 |
| 3,721,527 | 3/1973 | Lodige et al. | 426/521 |
| 3,780,182 | 12/1973 | Johnson et al. | 426/582 |
| 3,885,057 | 5/1975 | Warder et al. | 426/521 |
| 3,961,077 | 6/1976 | Kielsmeier | 426/582 |
| 3,962,483 | 6/1976 | Schulz | 426/582 |
| 3,985,902 | 10/1976 | Coste | 426/582 |
| 4,016,298 | 4/1977 | Kasik et al. | 426/582 |
| 4,080,477 | 3/1978 | Tsumura et al. | 426/582 |
| 4,112,131 | 9/1978 | Bosy et al. | 426/582 |

*Primary Examiner*—Steve Alvo
*Attorney, Agent, or Firm*—Vogt & O'Donnell

[57] ABSTRACT

A sterilized processed cheese which has the texture of a thermally non-sterilized processed cheese and a process for producing a sterilized processed cheese of this type are disclosed.

7 Claims, No Drawings

METHOD FOR PRODUCING A STERILIZED PROCESSED CHEESE HAVING A CREAMY TEXTURE

This is a continuation of application Ser. No. 882,220, filed Feb. 28, 1978, now abandoned.

This invention relates to a sterilised processed cheese which has the texture of a thermally non-sterilised processed cheese. The invention also relates to a process for producing a sterilised processed cheese of this type.

Processed cheeses are the products obtained by melting a cheese or a mixture of cheeses optionally containing other derivatives of milk at around 85° to 90° C. in the presence of emulsifying salts known as "melting salts". This melting process is accompanied by fairly intense pasteurisation so that, providing there is no secondary contamination and providing they are packaged under heat, the processed cheeses obtained no longer contain vegetative germs and the enzymes present in them are largely inactivated. Nevertheless, these processed cheeses cannot be considered as sterile cheeses because they contain sporulated germs which are not destroyed by pasteurisation, such as for example *Clostridium sporogenes* and *Clostridium tyrobutyricum*, which can be brought to germination whenever favourable conditions prevail and all the more easily, the higher the water content of the cheese.

One way of preparing processed cheeses with good keeping properties is only to use starting materials strictly selected for their low sporulated germ content, the sole object in this case being to produce processed cheeses of low water content.

A second way is to use antibacterial agents, such as nisine, providing this is permitted by the food legislation in force.

It will readily be appreciated that these two methods are not a panacea.

A third way is to destroy the sporulated germs by heat and to apply sterilisation treatments for this purpose. Unfortunately, it is well known that sterilisation destroys the texture of the processed cheese. Thus, a processed cheese which has been thermally sterilised is immediately recognised by its glutinous texture and differs from a normal non-sterile processed cheese which is characterised by a creamy texture.

The present invention provides a sterilised processed cheese having the texture which is normally typical of a thermally non-sterilised processed cheese, i.e. the creamy texture mentioned above, irrespective of its water content.

The present invention also provides a process for producing a sterile processed cheese of this type, which comprises preparing a mass to be melted, sterilising this mass by melting at a temperature above 120° C., reducing the sterilised mass to a temperature of from 60° C. to 100° C. and developing at that temperature the normal texture of a processed cheese in the mass by dispersing in it a texturising agent consisting at least partly of a casein which is sterile in its native state.

For a better understanding both of the nature of the invention and of the terminology used in the following description, it would be advisable at this juncture to dwell briefly on some fundamental considerations on the subject of cheese.

The texture of natural cheeses is generally related to the structure of a three-dimensional protein network which was initiated by rennet during coagulation of the milk and then condensed and strengthened by syneresis during the draining process. This network, which holds the other constituents of the cheese in its meshes, is essentially formed by casein and micellar calcium, the micellar calcium acting as an intermolecular and intermicellar bridge. This network is stronger and more elastic, the higher its calcium content and providing the casein remains in the native state.

During the melting process, the network which is hydrophobic initially becomes hydrophilic under the effect of the melting salts and disperses into a continuous aqueous phase. Then, under the effect of thermal and mechanical factors, it absorbs water, hydrates and tends to gelate. It is this process, known as "creaming", which leads to the creamy texture characteristic of processed cheeses.

This absorption of water depends inter alia upon the temperatures reached during the melting process. Thus, it is known that creaming is optimal in the case of melting temperatures of from 80° to 90° C. and that it is no longer obtained if temperatures above 100° C. are applied. In this latter case, it would seem that the melting process gives rise to significant changes in the casein, which explains why it has hitherto not been possible to produce thermally sterilised processed cheeses having a correct texture.

In the context of the invention "casein in the native state" is understood to be a casein in the naturally occurring state which has the creaming properties mentioned above irrespective of whether it is a native casein or a casein present in the native state as a result of a creaming process. In other words, it is casein which has either not been heat treated and therefore does not possess a glutinous texture, but rather, a creamy texture or a casein which may have been heat treated, but as a result of a creaming process such as the one described herein, possesses a creamy texture.

The expression "texturising agent consisting at least partly of a casein sterile in its native state" naturally covers all types of casein which are sterile in the native state, either individually or in admixture, and also mixtures of these caseins with other ingredients and, in particular, a sterile processed cheese according to the invention. Accordingly, a sterile processed cheese emanating from a preceding production batch may be used as texturising agent. In other words, the texturising agent includes a sterile casein having a creamy texture.

Accordingly, it is necessary to prepare a first sample of sterile texturising agent which, of course, cannot be obtained by thermal sterilisation. To this end, a sample of non-sterile texturising agent (casein, processed cheese, etc.) is initially prepared and then added to a thermally sterilised mass, i.e. a mass of undesirable texture. The mass then reassumes a suitable texture, as described above, but contains a distinctly reduced concentration of germs, particularly sporulated germs, by comparison with the concentration of nonsterile texturising agent initially used. Thereafter it is in turn used as texturising agent and so on. Accordingly, the procedure adopted is based on successive dilutions and "sub-cultures". It has been found that, for a dilution level of 10% (1 part by weight of texturising agent to 9 parts by weight of thermally sterilised mass), 5 successive operations of this type are sufficient to obtain a degree of sterility which, although not absolute, is at least satisfactory for practical purposes.

The preparation of a mass for melting does not require any particular comment. It is carried out strictly conventionally in the presence of melting salts, such as citrates or phosphates.

The mass in question is sterilised by treatment at a temperature above 120° C. which is of course dependent upon the heating time and upon the sporulated germ content of the mass to be sterilised. Well known theoretical considerations have established a logarithmic relation between the sterilisation time and sterilisation temperature and the level of destruction of the sporulated germs. Accordingly, the sterilisation parameters will be selected to obtain maximum destruction whilst, at the same time, remaining within limits compatible with the product and the apparatus used. For masses of the type normally available, sterilisation is with advantage carried out for from 45 to 15 seconds at a temperature in the range from 130° to 150° C.

The quantity of texturising agent to be dispersed in the mass, of which the temperature has been reduced to from 60° to 100° C., for example to around 85° C., may be selected within a fairly wide range, advantageously from 0.5% to 20%. The mass obtained is preferably stirred in order to accelerate the creaming process.

The processed cheeses thus prepared, of which the water content is immaterial (i.e. it may be either from 40 to 50% or from 50 to 70%), are sterile and, as such, may be kept for at least 6 months at ambient temperature providing they are protected against contamination, for example during their packaging. They have the characteristic texture and the organoleptic properties of a corresponding normal processed cheese, i.e. a processed cheese which has not been subjected to thermal sterilisation. Their sterile character is not attributable to the presence of an antibacterial additive although, food legislation permitting, there is of course nothing to prevent an antibacterial additive from being added.

The process according to the invention may be carried out either in batches or continuously by means of heat exchangers, for example of the scraped surface type, or steam injectors. The second of these two variants has the advantage of an intense, but brief and perfectly controlled heat treatment which minimises the dangers of browning by a Maillard reaction, above all where the products in question are rich in lactose. In addition, the expansion following the injection of steam itself normally causes the desired cooling to a temperature below 100° C.

In one preferred embodiment of the continuous variant of the process, a mass for melting is prepared from cheese, such as Cheddar, Emmental, etc., or from various lactic ingredients, according to the required recipe, water and conventional melting salts, and the resulting mixture is heated while stirring to around 75° to 80° C. to obtain a homogeneous mass which is sterilised by the injection of steam under pressure at 140° to 145° C. By sudden expansion, the molten, sterile mass is cooled to between 80° and 90° C. A sample of sterile processed cheese from a preceding production batch is then introduced into the mass in a quantity of from 2 to 5%, after which the whole is stirred while maintaining the temperature. After a time which varies according to the composition of the mass, the sterilisation temperature, the intensity of mixing and the quantity of sterile processed cheese added, but which is normally from 2 to 15 minutes, the texture changes into the texture of a normal processed cheese. The product obtained is then aseptically packaged in hermetic packages.

In the following Examples, which are intended purely for illustrative purposes, the percentages quoted represent % by weight.

EXAMPLE 1

A mixture containing 41.5% by weight of finely divided Cheddar, 13.8% of butter, 7% of whey powder, 1.2% of melting salts (sodium polyphosphate and/or citrate) and 36.5% of water is prepared. The mixture contains approximately 45.6% of solids, including 25.1% of fats, and has a pH of 5.75. This mixture is then sterilised under pressure at 145° C. (20 s) in a steam injector. By expansion on leaving the injector, the sterilised molten mass is cooled to a temperature of 86° C. 4% of a sample of sterile processed cheese from a preceding production batch are then added to it, followed by stirring for 3 to 6 minutes at that temperature in a Stephan apparatus. The product obtained is then packaged in heat-sealed containers.

Analysis of the product reveals a sporulated germ content of less than 1 per 100 g, the lower limit of detection of the analysis method.

This sterile processed cheese is kept for 3 to 4 months at ambient temperature. When the containers are opened, they reveal a pleasant-tasting processed cheese of mellow texture showing no signs of microbial degradation or browning. This cheese separates without difficulty from aluminium foil.

COMPARISON EXAMPLES (a) A traditional processed cheese is prepared from the starting mixture of Example 1 by pasteurisation at 85° C. in a scraped-surface heat exchanger. Although the processed cheese obtained has the desired unctuous texture, it does not keep for more than 3 to 4 weeks, depending upon the sporulated germ content of the starting materials.

(b) The procedure described in Example 1 is repeated omitting the step in which the sample of sterile processed cheese from the preceding production batch is added. The sterile processed cheese obtained in this case has an unpleasant, glutinous texture. This texture does not develop during storage; it remains glutinous. The cheese can no longer be separated from aluminium foil.

EXAMPLE 2

The procedure described in Example 1 is repeated with the same starting mixture which is deliberately infected with 1% of *Clostridium sporogenes*. Nevertheless the processed cheeses obtained, which have the desired texture, are found to be indeed sterile because they keep in containers like the cheese of Example 1.

COMPARISON EXAMPLE

A traditional pasteurised processed cheese is prepared in the same way as described in Comparison Example 1a from a starting mixture infected as described in Example 2. The processed cheese obtained is a veritable disaster from the point of view of its keeping properties. After only 8 to 10 days, the product has changed to the extent of being unfit for consumption.

EXAMPLE 3

This Example describes the preparation of an initial sample of texturising agent, in this case sterile processed cheese.

To this end, a cheese mixture rich in casein is prepared and sterilised after melting. 10% of a non-sterile processed cheese are then added to this mixture cooled to 85° C. The whole is then stirred for 10 to 15 minutes in a Stephan apparatus. The mass obtained has then assumed the desired texture.

A sample of this mass less rich in sporulated germs than the starting mixture is then removed and added in a quantity of 10% to an analogous sterilised mixture of which the temperature has been reduced to 85° C. The whole is stirred until the required texture is obtained.

This process of successive dilutions and sub-cultures is then repeated 5 times in all and the mass of processed cheese ultimately obtained is found to be identical in its keeping properties with that of Example 1, i.e. it may in practice be regarded as sterile. It may therefore be used as a texturising agent.

We claim:

1. A process for producing a sterilised processed cheese having a creamy texture which comprises preparing a starting material cheese mass to be melted, sterilising this mass by melting at a temperature above 120° C., reducing the sterilised mass to a temperature of from 60° to 100° C. and developing at that temperature the normal texture of a processed cheese that has not been thermally sterilised in the mass by dispersing in it 0.5 to 20% of a texturising agent consisting of an essentially sterile casein having a creamy texture, said texturising agent prepared by:

(a) providing a thermally sterilised processed cheese having a glutinous texture;
(b) diluting in the sterilised cheese a nonsterilised processed cheese having a creamy texture to provide a partially sterile, creamy textured processed cheese; and
(c) repeating steps (a) and (b), each time diluting a thermally sterilised processed cheese with the partially sterile cheese produced in step (b), until an essentially sterilised processed cheese having a creamy texture is obtained.

2. A process as claimed in claim 1, wherein the mass is sterilised by keeping it for 45 to 15 seconds at a temperature in the range from 130° to 150° C.

3. A process as claimed in claim 2, wherein the mass is sterilised in a scraped-surface heat exchanger.

4. A process as claimed in claim 1, wherein the mass is sterilised by the injection of steam.

5. A process as claimed in claim 1, wherein the sterile processed cheese is a sample of a sterilised processed cheese from the preceding production batch.

6. A process as claimed in claim 1, wherein the texturising agent is incorporated at a temperature of from 80° to 90° C.

7. A process as claimed in claim 1, wherein the mixture of the sterilised processed cheese and the texturising agent is stirred.

* * * * *